US012488803B2

(12) United States Patent
Kumar et al.

(10) Patent No.: US 12,488,803 B2
(45) Date of Patent: Dec. 2, 2025

(54) METHOD AND SYSTEM FOR ENCODING AND WIRELESSLY TRANSMITTING STEREO AUDIO CONTENT FOR AUDIO COMMUNICATION

(71) Applicant: Apple Inc., Cupertino, CA (US)

(72) Inventors: Aarti Kumar, Los Altos, CA (US); Eric A. Allamanche, Sunnyvale, CA (US); Su Fu, Mountain View, CA (US); Leijun Dong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 17/741,874

(22) Filed: May 11, 2022

(65) Prior Publication Data

US 2022/0392460 A1 Dec. 8, 2022

Related U.S. Application Data

(60) Provisional application No. 63/197,001, filed on Jun. 4, 2021.

(51) Int. Cl.
*G10L 19/008* (2013.01)
*G10L 19/24* (2013.01)
(Continued)

(52) U.S. Cl.
CPC ............ *G10L 19/008* (2013.01); *G10L 19/24* (2013.01); *H04M 1/6033* (2013.01);
(Continued)

(58) Field of Classification Search
CPC ..... G10L 19/008; G10L 19/24; G10L 19/167; H04M 1/6033; H04M 2250/02;
(Continued)

(56) References Cited

U.S. PATENT DOCUMENTS 7,765,019 B2 7/2010 Sinai
2008/0144645 A1* 6/2008 Russell .................. H04L 47/10
370/412

(Continued)

FOREIGN PATENT DOCUMENTS

CN 111225102 A 6/2020
EP 1701484 A1 9/2006
WO 2020239985 A1 12/2020

*Primary Examiner* — Michael N Opsasnick
(74) *Attorney, Agent, or Firm* — Aikin & Gallant, LLP (57) ABSTRACT

Disclosed are systems and methods to modify the Bluetooth mono HFP protocol to support bi-directional stereo operation for high bandwidth audio including 12-KHz wide-band, 16-KHz super wide-band (SWB), and 24-KHz full band (FB) audio. The techniques leverage the larger packet size and longer duty cycle of the 2-EV5 transport packet and expand the block size of the audio frames generated by the AAC-ELD codec to increase the maximum data throughput from the 64 kbps of the mono HFP protocol to 192 kbps using a stereo HFP protocol. The increased throughput not only supports stereo operations, but allows the transport of redundant or FEC packets for increased robustness against packet loss. In one aspect, the AAC-ELD codec may be configured for dynamic bit rate switching to flexibly perform trade-offs between audio quality and robustness against packet loss. The stereo HFP may configure the maximum throughput based on the desired audio quality.

20 Claims, 7 Drawing Sheets

(51) Int. Cl.
  *H04M 1/60* (2006.01)
  *H04R 5/033* (2006.01)
  *H04R 5/04* (2006.01)

(52) U.S. Cl.
  CPC ............... *H04R 5/033* (2013.01); *H04R 5/04* (2013.01); *H04M 2250/02* (2013.01)

(58) Field of Classification Search
  CPC ....... H04M 1/6066; H04R 5/033; H04R 5/04; H04R 2420/07; H04N 21/42203; H04N 21/4852; H04N 21/43637; H04S 2420/03; H04W 4/80; H04L 1/004
  See application file for complete search history.

(56) References Cited

U.S. PATENT DOCUMENTS

| | | | |
|---|---|---|---|
| 2008/0279162 A1* | 11/2008 | Desai | H04W 72/1215 |
| | | | 370/338 |
| 2016/0164942 A1 | 6/2016 | Reddappagari et al. | |
| 2017/0372708 A1* | 12/2017 | Chebiyyam | G10L 21/038 |
| 2019/0104423 A1 | 4/2019 | Hariharan et al. | |
| 2019/0104424 A1* | 4/2019 | Hariharan | H04L 1/1621 |
| 2021/0067874 A1* | 3/2021 | Xu | H04R 5/02 |
| 2021/0092579 A1* | 3/2021 | Weinans | H04W 4/80 |
| 2021/0343299 A1* | 11/2021 | Gao | G10L 19/032 |

\* cited by examiner

Possible Stereo AAC-ELD Configurations over 2-EV5 Packets (360 Bytes/Packet) at 15 ms Intervals

| Config | Block size of audio frames | Number of main ELD packets | Data rate (kbps) | Number of redundant packets | Single packet loss recovery rate |
|---|---|---|---|---|---|
| 24 KHz Stereo Medium Quality | Nominal | 2 | 96 | 2 | 100% |
| 24 KHz Stereo High Quality | Nominal | 2 | 128 | 1 | 50% |
| 32 KHz Stereo Medium Quality | Expanded | 1 | 96 | 1 | 100% |
| 32 KHz Stereo High Quality | Expanded | 1 | 128 | 1 | 100% (reduced quality) |
| 48 KHz Stereo Packet Fragmentation | Expanded | 3/2 (3 ELD in 2 BT packets) | 192 | 0 | 0% |
| 48 KHz Stereo | Intermediate | 2 | 192 | 0 | 0% |

METHOD AND SYSTEM FOR ENCODING AND WIRELESSLY TRANSMITTING STEREO AUDIO CONTENT FOR AUDIO COMMUNICATION

CROSS REFERENCE TO RELATED APPLICATIONS

This application claims the benefit of U.S. Provisional Application No. 63/197,001 filed on Jun. 4, 2021, the disclosure of which is incorporated herein by reference in its entirety.

FIELD

This disclosure relates to the field of audio communication including techniques for encoding and packetizing speech as stereo audio signals for transmissions over a Bluetooth link. Other aspects are also described.

BACKGROUND

Consumer electronic devices such as smartphones, laptop computers, digital media players, wearable devices, desktop computers, etc., may exchange audio content with wireless headsets (e.g., in-ear headphones or earbuds, over-the-ear headsets, etc.). For example, wireless headsets may be communicatively coupled to electronic devices via a wireless communication protocol such as the Bluetooth protocol for wearers of the wireless headsets to engage in voice calls with remote users, listen to media content, issue voice commands, obtain query responses, etc. When using the Bluetooth protocol for bi-directional voice communication, the Bluetooth protocol is typically configured to transmit monophonic content in either direction to reduce audio processing complexity and latency. For example, the Bluetooth protocol may be configured in the Hands-Free Profile (HFP) for conducting hands-free calls using a single audio channel. HFP for monophonic audio signals limits the data transmission to a maximum data rate of 64 kilobits-per-second (kbps) by digitally encoding speech signals and packetizing encoded audio frames into a 60-byte packet every 7.5 ms. The data throughput constraint limits the sampling rate of the speech signals to 16 KHz, reducing the bandwidth of the speech signals in high-fidelity applications and compromising the audio quality of the audio signals rendered at the wireless headsets.

SUMMARY

Audio applications that process speech signals such as those used in telephony, videoconferencing, or voice query context may enhance audio quality by transmitting and receiving audio signals in stereo format carried by two or more audio channels over a Bluetooth link. For example, videoconferencing applications may transmit stereoscopic speech signals to allow a wireless headset to spatially render the speech signals to create the perception of directionality of the speaker to the listener. In another example, a listener carrying on a conversation with another person using a videoconferencing application may listen to music streamed in stereo format. Bluetooth protocol that is conventionally configured to transmit monophonic content may be adapted to transmit speech signals in stereo format in both directions to enhance the quality of audio signals rendered at a receiving device.

Bluetooth communication protocols such as the Hands-Free Profile (HFP) or the Headset Profile (HSP) may be used to exchange digitized audio data over a bi-directional wireless link between a source device and a listening or playback device such as a wireless headset. These profiles may support "voice-quality" or low-quality single channel or monophonic audio communication between the devices. For example, mono HFP typically uses codecs (e.g., low complexity modified sub-band codec (mSBC)) with a sampling rate of 16 KHz. Mono HFP may be expanded to support Advanced Audio Coding-Enhanced Low Delay (AAC-ELD) codec with a higher sampling rate of 24 KHz to generate audio frames having a duration of 7.5 ms and a frame size of 180 samples. The audio frames, may be packetized into ELD packets and the ELD packets assembled into Bluetooth 2-EV3 transport packets having a packet size of 60 bytes every 7.5 ms, yielding a maximum bit rate of 64 kbps. The sampling rate and the throughput of the mono HFP may support 12 KHz wide-band (WB) uplink and downlink monophonic audio, but the configuration is insufficient to support the higher throughput needed for bi-directional stereo audio. Mono HFP is also insufficient to support the higher sampling rate needed for higher bandwidth audio such as 16 KHz super wide-band (SWB) or 24 KHz full-band (FB) audio.

Systems and methods are disclosed to modify the mono HFP protocol to support stereo operation for high bandwidth audio including WB, SWB and FB audio. In one aspect, the 2-EV3 transport packets of the mono HFP with a packet size of 60 bytes and a packet duration of 7.5 ms may be expanded to use the 2-EV5 transport packets having a packet size of 360 bytes and a packet duration of 15 ms. The newer 2-EV5 transport packets is an enhancement to the Bluetooth protocol to provide larger Bluetooth transport packets at a longer duty cycle. Using the 2-EV5 transport packets allows a tripling of the data throughput from 64 to 192 kbps. The increased throughput may be used to support stereo WB audio signals based on the same sampling rate and the same block size of audio frames used for mono HFP. For example, the AAC-ELD codec may be configured to generate two streams or channels of stereo audio signals using the same sampling rate of 24 KHz as the mono HFP. The 24 KHz stereo AAC-ELD configuration may generate audio frames with a frame size (also referred to as block size) of 180 samples and a frame duration of 7.5 ms for each channel. The audio frames of the two channels may be packetized into ELD packets of different sizes as a function of the desired audio quality.

In one aspect, for encoding stereo WB audio in the so called "medium quality" level, two ELD packets within a current 15 ms interval, each ELD packet packetized from the 180-sample audio frames of each of the two channels, may be bundled with two ELD packets from a previous 15 ms interval to constitute the 2-EV5 transport packet of 360 bytes every 15 ms. The two ELD packets of the previous 15 ms interval are considered redundant or forward error correction (FEC) packets that may be used by the decoder to recover up to 100% of single packet loss. The two new ELD packets of the current 15 ms interval yields a maximum effective data rate of 96 kbps. In one aspect, for encoding stereo WB audio in the so called "high quality" level, two ELD packets within a current 15 ms interval of the 2-EV5 transport packet, each ELD packet packetized from the 180-sample audio frames of each of the two channels, may be bundled with one of the two ELD packet from a previous 15 ms interval to constitute the 360 bytes of the 2-EV5 transport packet every 15 ms. The ELD packets for the high quality stereo WB audio may be larger than the ELD packets for the medium quality stereo WB audio to provide higher data rate. For example, the high quality stereo WB audio may have a maximum effective data rate of 128 kbps. The redundant or FEC packet from the previous 15 ms interval may allow recovery of up to 50% of single packet loss. The high quality stereo WB audio thus achieves higher audio quality but at a cost of reduced robustness against packet loss when compared to the medium quality stereo WB audio.

In one aspect, the audio frame of 7.5 ms supporting a maximum block size of 180 samples may be expanded to support the higher sampling rate and the resulting bigger block size needed for sampling and encoding the wider audio bandwidth of the 16 KHz SWB or the 24 KHz FB audio. For example, the AAC-ELD decoder of the Bluetooth audio link may support a maximum block size of 480 samples. In one aspect, for encoding the SWB audio with an audio bandwidth of 16 KHz, the AAC-ELD codec may be configured with a sampling rate of 32 KHz to generate stereo audio samples. The 32 KHz stereo AAC-ELD configuration may generate audio frames with a block size of 480 samples and a frame duration of 15 ms for each channel. The audio frames of the two channels may be packetized into ELD packets of different sizes as a function of the desired audio quality.

In one aspect, for encoding stereo SWB audio in the so called "medium quality" level, one ELD packet packetized from the 480-sample audio frame of each channel for a current 15 ms interval may be bundled with one ELD packet from a previous 15 ms interval to constitute the 2-EV5 transport packet of 360 bytes every 15 ms. The ELD packet of the previous 15 ms interval is the redundant or FEC packet that may be used by the decoder to recover up to 100% of single packet loss. The ELD packet of the current 15 ms interval yields a maximum effective data rate of 96 kbps. In one aspect, for encoding stereo SWB audio in the so called "high quality" level, one ELD packet packetized from the 480-sample audio frame of each of the two channels for a current 15 ms interval may be bundled with a smaller ELD packet packetized from the audio frame of a previous 15 ms interval to constitute the 360-byte 2-EV5 transport packet every 15 ms. The ELD packets for the high quality stereo SWB audio may be larger than the ELD packets for the medium quality stereo SWB audio to provide higher data rate. For example, the high quality stereo SWB audio may have a maximum effective data rate of 128 kbps. The ELD packet of the redundant or FEC packet from the previous 15 ms interval may allow recovery of up to 100% of single packet loss, albeit at a reduced audio quality due to the smaller ELD packet size. The high quality stereo SWB audio thus achieves higher audio quality but at a cost of reduced robustness against packet loss when compared to the medium quality stereo SWB audio.

In one aspect, for encoding FB audio with an audio bandwidth of 24 KHz, the AAC-ELD codec may be configured with a sampling rate of 48 KHz to generate stereo audio signals. The 48 KHz stereo AAC-ELD configuration may generate audio frames with a block size of 480 samples and a frame duration of 10 ms for each channel. The audio frames of the two channels may be packetized into ELD packets. One ELD packet for a current 10 ms may be bundled or concatenated with one half of another ELD packet packetized from a previous or a next 10-ms audio frame to constitute the 2-EV5 transport packet of 360 bytes every 15 ms. Three ELD packets are thus fragmented into two Bluetooth transport packets. The 360 bytes from the 1½ new ELD packets every 15 ms yields a maximum effective data rate of 192 kpbs. Because the new ELD packets fully occupy each 2-EV5 transport packet, no redundant or FEC packets are available for recovery from packet loss.

In one aspect, if the AAC-ELD decoder of the Bluetooth audio link supports a maximum block size of 360 samples, packet fragmentation associated with the 48 KHz stereo AAC-ELD configuration may be eliminated. For example, to sample and encode the FB audio in stereo, the AAC-ELD codec may be configured with a sampling rate of 48 KHz to generate audio frames with a block size of 360 samples and a frame duration of 7.5 ms for each channel. The audio frames of the two channels may be packetized into ELD packets. Two ELD packets in a 15 ms interval may be bundled or concatenated to constitute the 2-EV5 transport packet of 360 bytes every 15 ms, yielding a maximum effective data rate of 192 kbps.

Advantageously, aspects of the disclosure configure the AAC-ELD codec to support bi-directional stereo operation using the same sampling rate and block size of audio frames as mono HFP by leveraging the larger packet size of the 2-EV5 transport packets. Both the downlink audio from the local source device to the receiving device and the uplink audio from the receiving device to the local source device may use the same sampling frequency of 24 KHz to sample and encode the 12 KHz bandwidth of WB audio in two channels. A packetized audio frame is smaller than the 2-EV5 transport packet and several packetized audio frames may be bundled to constitute the 2-EV5 transport packet, allowing decoupling of the audio payload of the ELD packets and the Bluetooth transport packets. In one aspect, the larger 2-EV5 packet size may allow the transport of redundant or FEC packets to allow the receiving device to recover from packet loss.

Advantageously, aspects of the disclosure also configure the AAC-ELD codec to support bi-directional stereo operation for the higher bandwidth of the SWB or FB audio by expanding the block size of the audio frames generated by the AAC-ELD codec from 180 samples to 480 samples. In one aspect, The AAC-ELD codec may be configured to sample and encode SWB or FB audio in two channels by increasing the sampling rate to 32 KHz and 48 KHz, respectively. The downlink and uplink audio may use different sampling frequencies to support audio of different qualities or bandwidths. The support for 48 KHz stereo audio in downlink enables audio quality similar to or exceeding that of uni-directional wireless audio connection such as the Advanced Audio Distribution Profile (A2DP). In one aspect, the AAC-ELD codec may be configured for dynamic bit rate switching to enable trade-offs between audio quality and robustness against packet loss.

A method of streaming stereo audio signals over a Bluetooth link from a source device to a receiving device is disclosed. The method includes the source device initializing audio parameters to configure a stereo communication profile of the Bluetooth link. The audio parameters may include a configured sampling rate of a codec, a configured block size of encoded audio frames, and a configured audio quality level. The method also includes the source device receiving stereophonic audio signals that includes audio signals for two channels. The method further includes the source device encoding the audio signals in the two channels based on the configured sampling rate into the encoded audio frames of the configured block size for each of the two channels. The method further includes the source device processing the encoded audio frames of the two channels into transport packets based on the configured audio quality level. The method further includes the source device transmitting the transport packets over the Bluetooth link to the receiving device.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

When communicating audio content such as speech signals over a Bluetooth link, it is desirable to enhance the audio quality by enabling bi-directional audio signal transmission in stereo format carried on two or more channels. Although downlink streaming of stereo music from a source device such as a smartphone to a sink device such as a wireless headset over the Bluetooth link is common, bi-directional voice communication has been limited to a single audio channel due to processing latency considerations. However, many applications may benefit from bi-directional stereo voice communication. For example, telephony or videoconferencing applications may encode speech signals received from multiple microphones for transport on the left and right channels to enable the rendering of spatial audio. The applications may also stream music in stereo format during a conversation session. In applications with head tracking capability, binaural stereo signals may be transmitted to a wireless headset to provide a more immersive listening experience.

Systems and methods are disclosed to modify the Bluetooth mono HFP protocol to support bi-directional stereo operation for high bandwidth audio including WB, SWB, and FB audio. Leveraging the larger packet size and longer duty cycle afforded by the 2-EV5 transport packet and expanding the block size of the audio frames generated by the AAC-ELD codec, the maximum data throughput may be tripled from 64 kbps of the mono HFP protocol to 192 kbps using a stereo HFP protocol. The increased throughput not only supports stereo operations, enabling AD2P-like audio quality (48 KHz) for downlink, but allows the transport of redundant or FEC packets for increased robustness against packet loss. In one aspect, the AAC-ELD codec may be configured for dynamic bit rate switching to flexibly perform trade-offs between audio quality and robustness against packet loss.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

Figure 1:
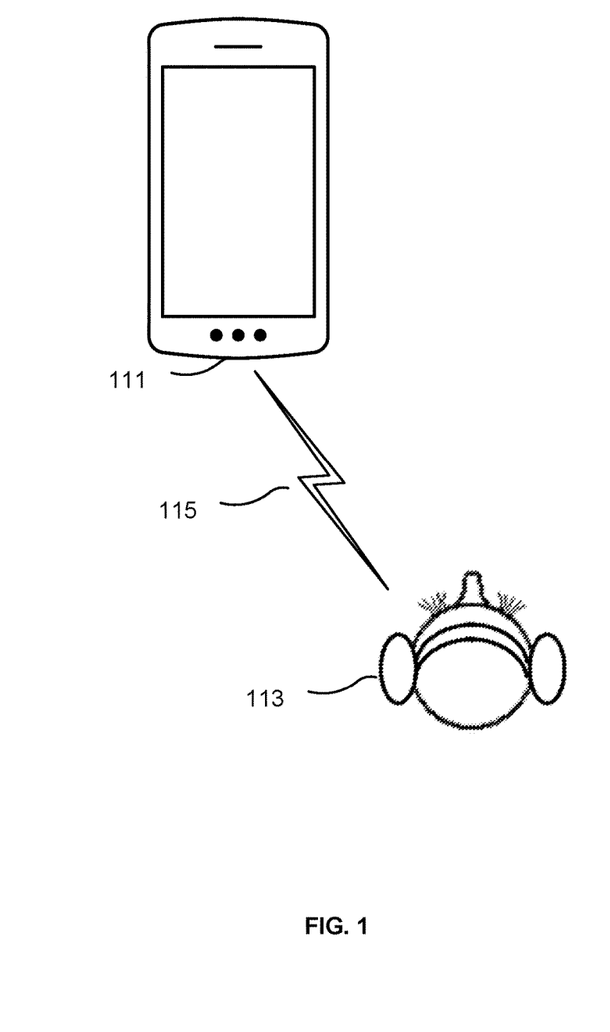
FIG. 1 depicts a scenario of a user wearing a wireless headset that is communicatively coupled to a smartphone over a Bluetooth audio link for the user to engage in a voice call according to one aspect of the disclosure.

FIG. 1 depicts a scenario of a user wearing a wireless headset 113 that is communicatively coupled to a smartphone 111 over a Bluetooth audio link 115 for the user to engage in a voice call according to one aspect of the disclosure. The smartphone 111 may run a telephony or videoconferencing application to allow the user to engage in a conversation with a remote user. In one application, the smartphone 111 may stream media content such as music to the user over the Bluetooth audio link 115 to allow the user to listen to the music through the wireless headset 113 while participating in a conversation.

The Bluetooth audio link 115 may be configured in a communication protocol such as stereo HFP used for conducting hands-free calls or the Headset Profile (HSP) to allow the smartphone 111 and the headset 113 to exchange audio content in stereo format using two audio channels as will be discussed. The smartphone 111 may receive downlink audio signals representing the speech of the remote user in the telephony or videoconferencing call from a remote device (not shown) via a network (e.g., the Internet). The remote device may capture the downlink audio signals in more than one audio channel using an array of microphones. In one aspect, the downlink audio signals may be mixed with streaming stereo music generated locally by the smartphone 111 or received through the network. The smartphone 111 may encode the downlink audio signals or the mixed audio content using the AAC-ELD codec to generate audio frames. The smartphone 111 may packetize the audio frames into ELD packets and bundle the ELD packets into 2-EV5 transport packets for downlink transmission over the Bluetooth audio link 115. The ELD packets may contain the encoded audio data in two channels, one for the left ear and one for the right ear of the wireless headset 113.

The wireless headset 113 may receive the 2-EV5 transport packets of the downlink transmission, disassemble the 2-EV5 transport packets into its constituent ELD packets, unpack the ELD packets of the two channels into audio frames, and decode the audio frames using AAC-ELD decoder into the left and right channel for the left ear and the right ear, respectively, to enable the rendering of spatial audio to the user. The wireless headset 113 may contain an array of microphones to capture the near-field speech signals of the user in more than one channel. The wireless headset 113 may encode the near-field speech signals using the AAC-ELD codec to generate audio frames, packetize the audio frames into ELD packets, and bundle the ELD packets into 2-EV5 transport packets for uplink transmission over the Bluetooth audio link 115. The ELD packets may contain the encoded near-field speech signals in two channels. The smartphone 111 may receive the 2-EV5 transport packets of the uplink transmission, disassemble the 2-EV5 transport packets into its constituent ELD packets, and unpack the ELD packets of the two channels into audio frames for the two channels. The smartphone 111 may further process the audio frames for transmission to the remote device through the network.

Figure 2A:
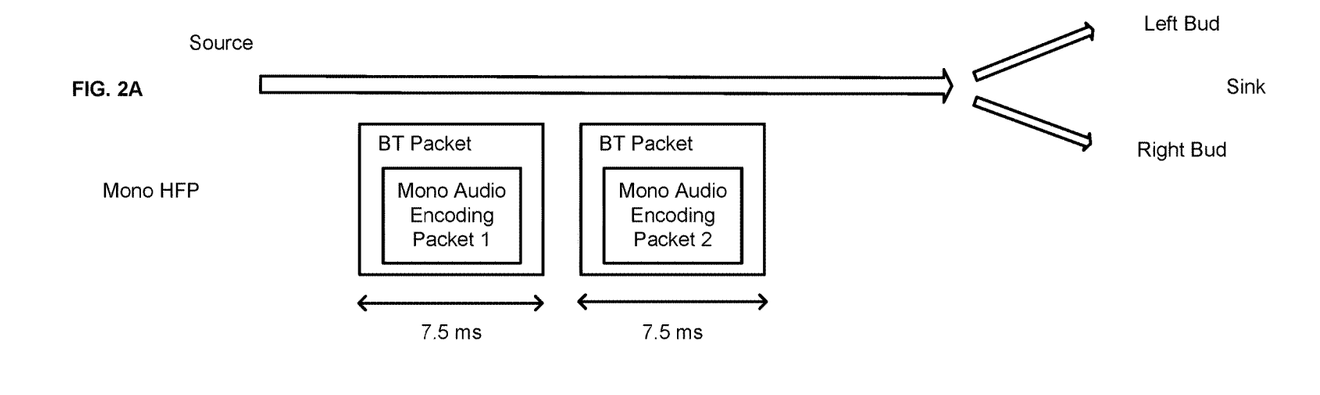
FIG. 2A depicts monophonic audio content encoded in packetized audio frames that are transmitted in Bluetooth transport packets using mono Hands-Free Profile (HFP) so that the same audio frames are heard by both the left and the right buds of a wireless headset.

FIG. 2A depicts monophonic audio content encoded in packetized audio frames that are transmitted in Bluetooth transport packets using mono Hands-Free Profile (HFP) so that the same audio frames are heard by both the left and the right buds of a wireless headset. A source device such as the smartphone 111 may use modified sub-band codec (mSBC) with a sampling rate of 16 KHz or AAC-ELD codec with a higher sampling rate of 24 KHz to encode a mono stream of audio data. The encoded audio frames may have a duration of 7.5 ms and a block size of 180 samples. The source device may packetize the audio frames into ELD packets and assemble the ELD packet into transport packets such as the Bluetooth Classic Enhanced Synchronous Connection-Oriented (eSCO) 2-EV3 packets for transmission to a sink device.

The 2-EV3 packet encapsulating one ELD packet of encoded mono audio may have a maximum packet size of 60 bytes and a packet duration or duty cycle of 7.5 ms. The mono HFP protocol thus may support two 2-EV3 packets or 120 bytes every 15 ms, yielding a maximum bit rate of 64 kbps. A sink device such as the wireless headset 113 may process the 2-EV3 packets to decode audio data of the mono stream. The decoded audio data of the mono stream is streamed to both the left and the right earphones or earbuds of the wireless headset 113. The 24 KHz sampling rate of the AAC-ELD codec and the maximum 64 kpbs throughput of the mono HFP may support 12 KHz wide-band (WB) mono audio in both uplink and downlink directions.

Figure 2B:
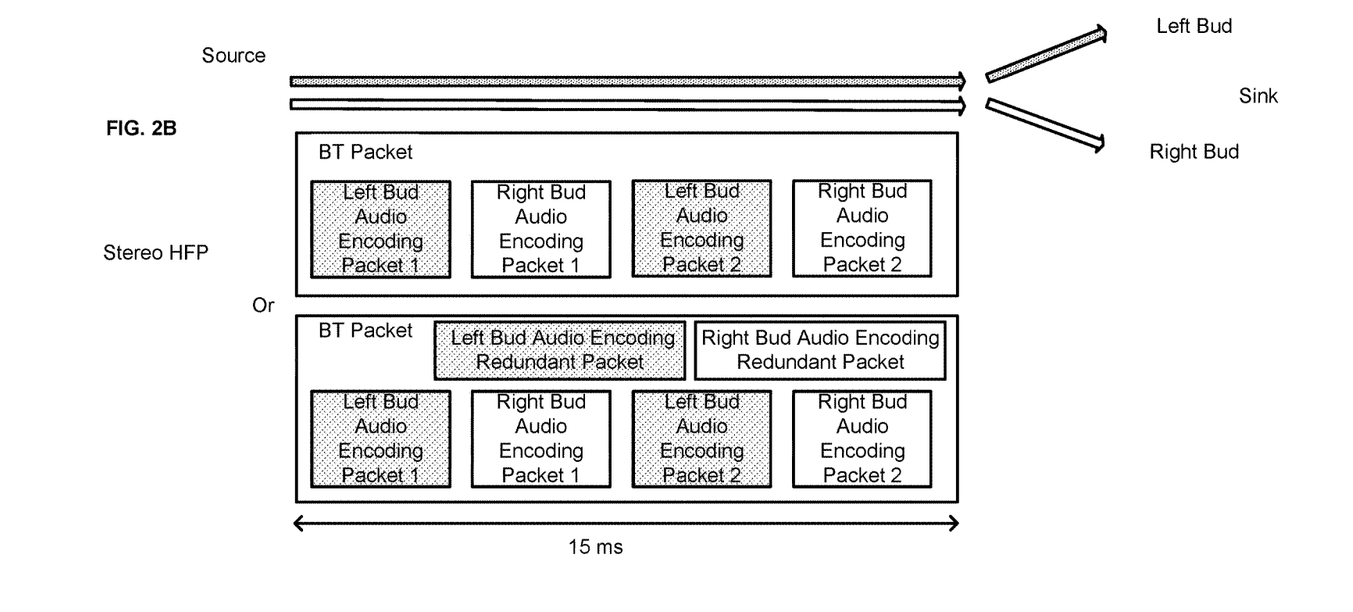
FIG. 2B depicts stereo audio content encoded in packetized audio frames for two channels and transmitted in Bluetooth transport packets using stereo HFP so that the audio frames for the two channels are separately heard by the left bud and the right bud of a wireless headset according to one aspect of the disclosure.

FIG. 2B depicts stereo audio content encoded in packetized audio frames for two channels and transmitted in Bluetooth transport packets using stereo HFP so that the audio frames for the two channels are separately heard by the left bud and the right bud of a wireless headset according to one aspect of the disclosure. In FIG. 2B, the Bluetooth transport packets use the larger eSCO 2-EV5 packets having a maximum packet size of 360 bytes and a packet duration or duty cycle of 15 ms to enable transmissions of the two channels of the stereo audio simultaneously.

In one aspect, for encoding stereo 12-KHz WB audio, a source device may configure the AAC-ELD codec in the stereo HFP to use the same 24 KHz sampling rate and to generate encoded audio frames having the same 180-sample block size as the mono HFP. The source device may encode the two streams of the stereo audio into separate audio frames. The encoded audio frames for each channel may have a frame duration of 7.5 ms and a block size of 180 samples. The source device may packetize the encoded audio frames for the two channels into ELD packets every 7.5 ms. The source device may bundle two ELD packets within a 15 ms interval into a 2-EV5 transport packet for transmission to a sink device, yielding a bit rate of 128 kpbs. A sink device such as the wireless headset 113 may process the 2-EV5 packets to decode audio data of the two channels. The decoded audio data for each channel is provided to either the left or the right earbuds of the wireless headset 113 to render stereo audio. The 128 kpbs throughput of the stereo HFP doubles the throughput of the mono HFP to support WB stereo audio in both uplink and downlink directions. In one aspect, for encoding stereo SWB or FB audio, the source device may configure the AAC-ELD device to use 32 KHz or 48 KHz sampling rate to generate encoded audio frames for each channel with a block size of 480 samples and a frame duration of 15 ms or 10 ms, respectively. The source device may packetize the encoded audio frames for the two channels into ELD packets for bundling into the 2-EV5 transport packets.

In one aspect, for stereo WB audio, the source device may bundle the two ELD packets, each packetized from the 180-sample encoded audio frames of each channel for a current 15 ms interval, with one of the two ELD packet transmitted in a previous 15 ms interval to generate a 2-EV5 transport packet of 360 bytes. The ELD packet from the previous 15 ms is considered a redundant or FEC packet that may be used by the sink device to recover the ELD packet if it was not received in the previous 15 ms. The redundant or FEC packet packetizes the encoded audio frame for the two channels to allow recovery of audio data for both channels. Because the source device transmits only one of the two ELD packet from the previous 15 ms as the redundant or FEC packet, the rate of single packet loss may be 50%. In one aspect, the source device may perform a trade-off between audio quality and robustness against packet loss to configure the stereo HFP to enable a 100% recovery rate from single packet loss at a cost of a reduction in audio quality.

Figure 3:
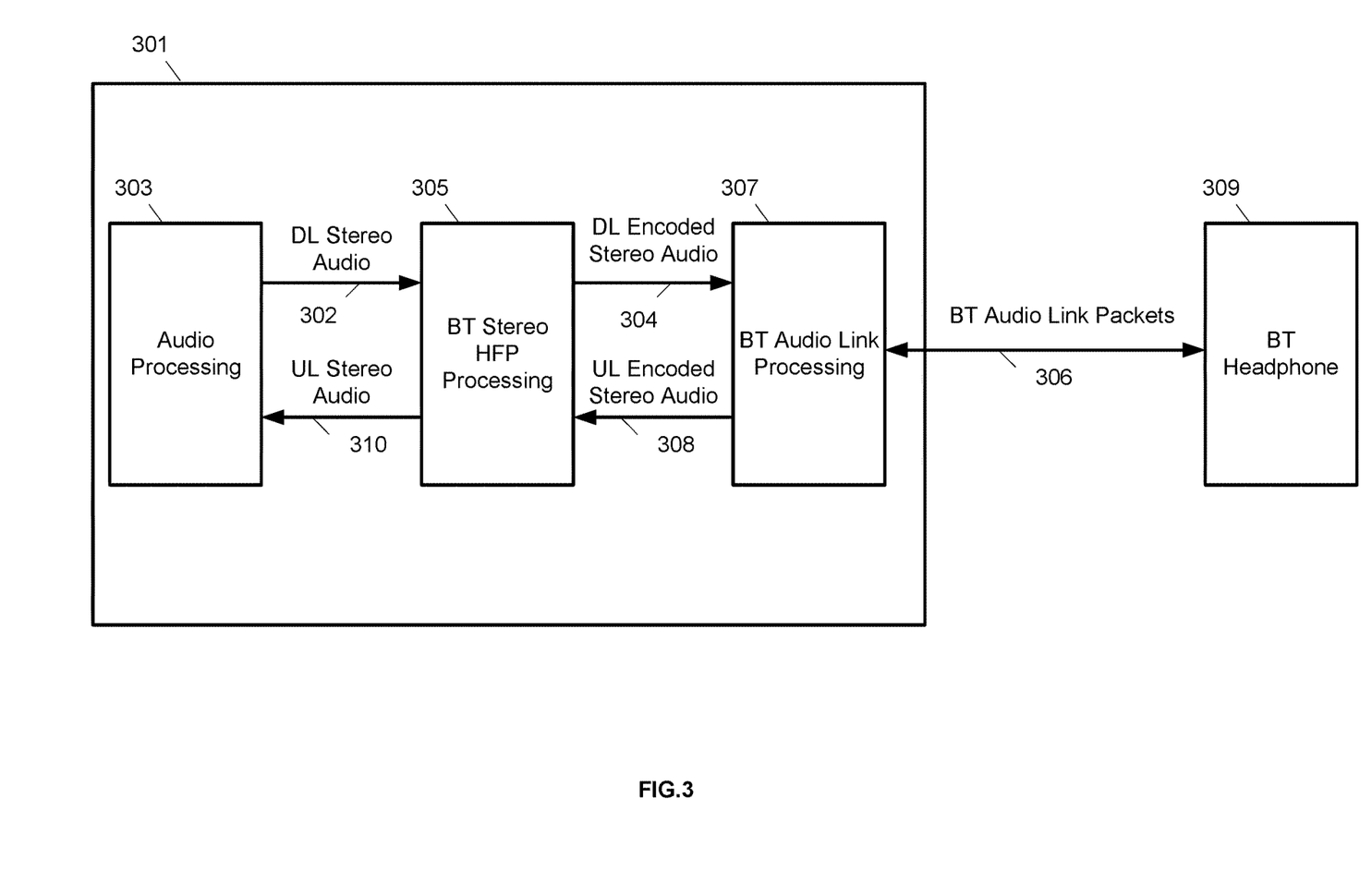
FIG. 3 is a block diagram of processing modules of a source device configured to encode and packetize stereo audio signals into transport packets for downlink transmission to a wireless headset, and to disassemble and decode uplink transport packets received from the wireless headset using stereo HFP according to one aspect of the disclosure.

FIG. 3 is a block diagram of processing modules of a source device 301 configured to encode and packetize stereo audio signals into transport packets for downlink transmission to a Bluetooth headphone 309, and to disassemble and decode uplink transport packets received from the Bluetooth headphone 309 using stereo HFP according to one aspect of the disclosure.

The source device 301 may be the smartphone 111 that runs an Internet Protocol (IP or Voice over IP (VoIP)) telephony or videoconferencing application to allow a user wearing the Bluetooth headphone 309 to engage in conversation with a remote user. An audio processing module 303 may receive audio signals in two channels representing the speech of the remote user, also referred to as the far-field speech signals, from a remote device via a network (e.g., the Internet). The audio signals may be encoded (e.g., MP3, AAC, etc.) and encapsulated in IP packets. The audio processing module 303 may disassemble the IP packets and decode the audio signal. In one aspect, the decoded two-channel far-field speech signals may be mixed with streaming music generated locally by the source device 301 or received through the network. The audio processing module 303 may output the decoded two-channel far-field speech signals or the mixed signals as downlink stereo audio signals 302.

A Bluetooth stereo HFP processing module 305 may encode the downlink stereo audio signals 302 using the AAC-ELD codec to generate audio frames of downlink encoded stereo audio signals 304 for each channel. AAC-ELD codecs are chosen for their good audio quality and low processing latency. For stereo HFP protocol, the source device 301 may configure the AAC-ELD codec to have a sampling rate of 24, 32, or 48 KHz for sampling 12-KHz WB, 16-KHz SWB, or 24-KHz FB audio, respectively. The source device 301 may also configure the AAC-ELD codec to generate audio frames of a selected block size and frame duration for each of the two channels as a function of the bandwidth of the audio signals. The block size may be selected to match the block size supported by the AAC-ELD decoder of the Bluetooth headphone 309. In one aspect, the audio frames for each channel may have a block size of 180 samples with a frame duration of 7.5 ms when sampling WB audio at 24 KHz, 480 samples with a frame duration of 15 ms when sampling SWB audio at 32 KHz, 480 samples with a frame duration of 10 ms when sampling FB audio at 48 KHz but would require packet fragmentation when bundling ELD packets into Bluetooth transport packets, or 360 samples with a frame duration of 7.5 ms when sampling the SWB audio at 48 KHz with no packet fragmentation, etc.

A Bluetooth audio link processing module 307 may packetize downlink encoded stereo audio signals 304 for the two channels into ELD packets. The ELD packets may be configured to have a packet size as a function of the desired audio quality and the bandwidth of the audio signals. The Bluetooth audio link processing module 307 may bundle or concatenate the ELD packets into the Bluetooth 2-EV5 transport packets having a maximum packet size of 360 bytes and a packet duration of 15 ms. In one aspect, the Bluetooth audio link processing module 307 may bundle into the 2-EV5 transport packets redundant or FEC packets used for packet loss recovery. The source device 301 may transmit the 2-EV5 transport packets containing packetized audio frames of the two channels of the downlink audio as the downlink component of the Bluetooth audio link packets 306 over the Bluetooth audio link to the Bluetooth headphone 309.

The Bluetooth headphone 309 may receive the downlink 2-EV5 transport packets, process the 2-EV5 transport packets to recover the ELD packets, unpack the ELD packets into audio frames for the two channels, and decode the audio frames using an AAC-ELD decoder into separate channels carrying stereo audio signals for the left ear and the right ear of the user. In one aspect, if redundant or FEC packets are available, the Bluetooth headphone 309 may process the redundant or FEC packets to recover an ELD packet that was lost from a previous downlink 2-EV5 transport packet due to interference or degraded channel condition.

For uplink communication, the Bluetooth headphone 309 may capture the near-field speech signals of the user in two channels. Similar to the source device 301, the Bluetooth headphone 309 may encode the near-field speech signals using an AAC-ELD coder to generate audio frames of encoded stereo audio signals for each channel as a function of the bandwidth of the audio signals. The Bluetooth headphone 309 may packetize the encoded stereo audio signals for the two channels into ELD packets and bundle or concatenate the ELD packets into the Bluetooth 2-EV5 transport packets as a function of the desired audio quality and the bandwidth of the audio signals. The Bluetooth headphone 309 may transmit the 2-EV5 transport packets containing packetized audio frames of the two channels of the uplink audio as the uplink component of the Bluetooth audio link packets 306 over the Bluetooth audio link to the source device 301. In one aspect, the downlink and uplink audio may be sampled at different sampling rates to generate encoded stereo signals of different audio qualities in the two directions. In one aspect, the downlink audio may be sampled at a higher sampling rate and allocated with more transmission bandwidth than the uplink audio to enable SWB or FB audio in the downlink only.

The Bluetooth audio link processing module 307 of the source device 301 may process the uplink 2-EV5 transport packets to recover the ELD packets containing the packetized audio frames of the two channels of the uplink audio. The Bluetooth audio link processing module 307 may unpack the packetized audio frames to recover the audio frames of uplink encoded stereo audio signals 308 for each channel. In one aspect, if redundant or FEC packets are available, the Bluetooth audio link processing module 307 may process the redundant or FEC packets to recover an ELD packet that was lost from a previous uplink 2-EV5 transport packet due to interference or degraded channel condition.

The Bluetooth stereo HFP processing module 305 may decode the audio frames of the uplink encoded stereo audio signals 308 for each channel using the AAC-ELD codec to generate the uplink stereo audio signal 310 for the two channels representing the near-field speech signals of the user. The audio processing module 303 may process the uplink stereo audio signal 310 for uplink transmission to the remote device through the network. For example, the audio processing module 303 may encode (e.g., MP3, AAC, etc.)

the uplink stereo audio signal 310 and encapsulate the encoded audio in IP packets. In one aspect, the audio processing module 310 may encapsulate the audio frames of the uplink encoded stereo audio signals 308 for each channel into IP packets for uplink transmission without first decoding using the AAC-ELD codec.

Figure 4:
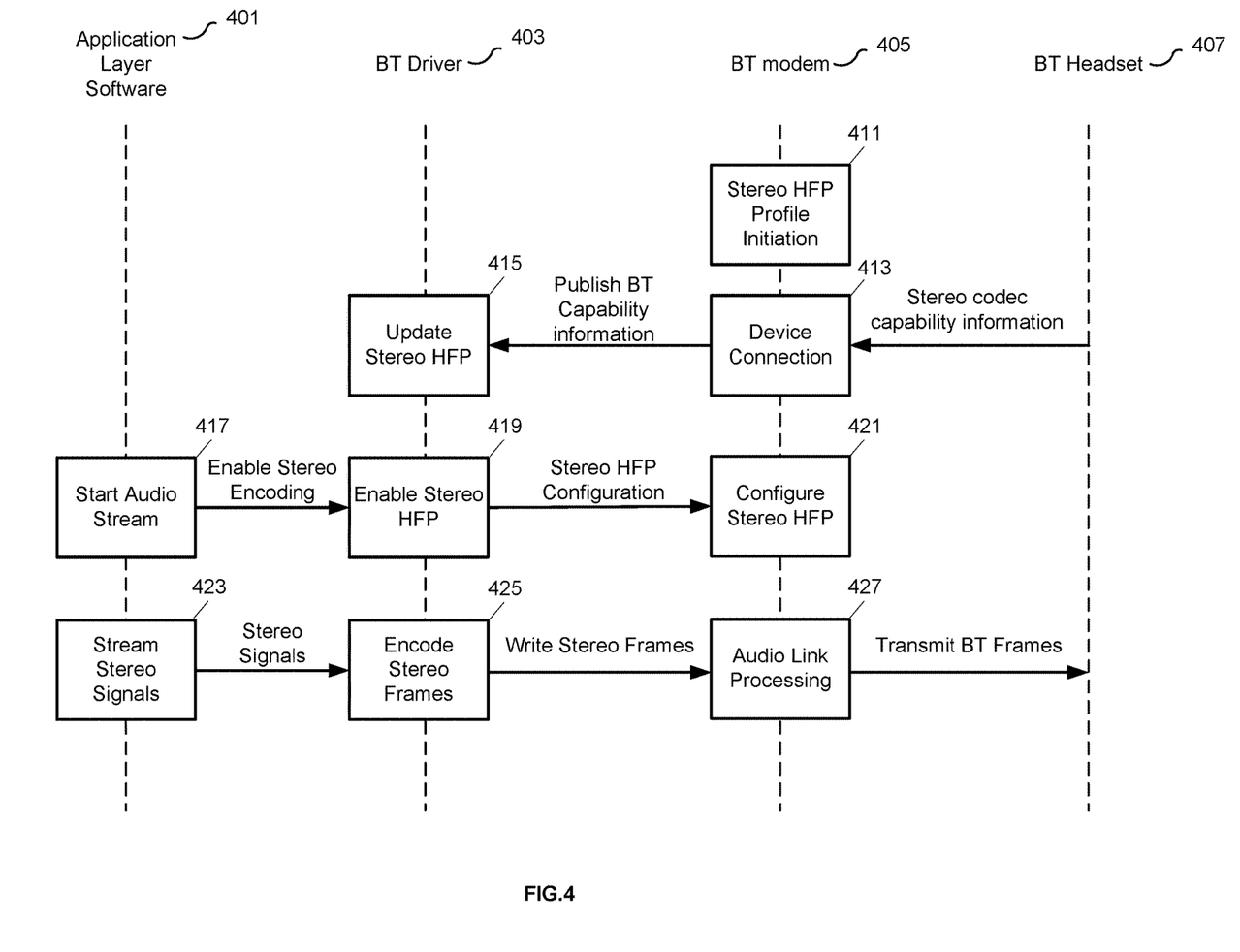
FIG. 4 is a call flow diagram of interactions between hardware and software components of a source device configured to encode and packetize stereo audio signals into transport packets for transmission over the Bluetooth audio link using stereo HFP according to one aspect of the disclosure.

FIG. 4 is a call flow diagram of interactions between hardware and software components of a source device configured to encode and packetize stereo audio signals into transport packets for transmission over the Bluetooth audio link using stereo HFP according to one aspect of the disclosure. The source device may include the application layer software 401, the Bluetooth driver 403, and the Bluetooth modem 405.

In one aspect, a processor of the source device may execute the application layer software 401 to run a telephony or videoconferencing application. For example, the application layer software 401 may implement the audio processing module 303 of FIG. 3 to allow a user to engage in a conversation with a remote user via a network. In one aspect, a processor may execute the Bluetooth driver 403 to configure the Bluetooth modem 405 to implement the stereo HFP protocol to exchange audio data with the Bluetooth headset 407. In one aspect, the Bluetooth driver 403 may implement the AAC-ELD codec of the Bluetooth stereo HFP processing module 305 of FIG. 3. In one aspect, the Bluetooth modem 405 may implement the packet processing of the ELD packets and the 2-EV5 transport packets of the Bluetooth audio link processing module 307 of FIG. 3.

At operation 411, the Bluetooth modem 405 determines if it has the capability to support the stereo HFP protocol, such as the larger packet size and longer duty cycle of the 2-EV5 transport packet and the larger block size of the audio frames generated by the AAC-ELD codec to enable bi-directional stereo operation over a Bluetooth link. The Bluetooth modem 405 may initialize the profile information of the HFP to indicate that it supports stereo HFP.

At operation 413, when the Bluetooth headset 407 connects with the Bluetooth modem 405, the Bluetooth headset 407 may transmit the capability information of its codec to the source device, such as whether it supports the AAC-ELD codec, the supported sampling rate of the AAC-ELD codec, the maximum block size of the decoder of the AAC-ELD codec, etc. The Bluetooth modem 405 may determine if the Bluetooth headset 407 supports stereo HFP and may publish capability information of the Bluetooth headset 407 and the profile information of the HFP supported by the Bluetooth modem 405 to the Bluetooth driver 403.

At operation 415, the Bluetooth driver 403 updates protocol information of the stereo HFP supported by the Bluetooth link between the source device and the Bluetooth headset 407 such as the supported audio parameters of the AAC-ELD codec based on the information received from the Bluetooth modem 405.

At operation 417, the application layer software 401 runs a telephony or videoconferencing application to establish a connection with a remote device to exchange audio data with the remote device through the network. The application layer software 401 may determine the desired performance parameters such as the desired audio quality level and the desired bandwidth of the audio data. The application layer software 401 may transmit a start signal with the desired performance parameters to the Bluetooth driver 403 to enable the stereo HFP.

At operation 419, the Bluetooth driver 403 configures the AAC-ELD codec based on the desired performance parameters. In one aspect, the Bluetooth driver 403 may configure the AAC-ELD codec with a sampling rate of 24, 32, or 48 KHz to sample 12-KHz WB, 16-KHz SWB, or 24-KHz FB audio, respectively. The Bluetooth driver 403 may configure the AAC-ELD codec to generate audio frames of a selected block size and frame duration based on the desired bandwidth. The Bluetooth driver 403 may transmit stereo HFP configuration information to the Bluetooth modem 405 based on the desired audio quality level and the desired bandwidth.

At operation 421, the Bluetooth modem 405 may configure the processing of the ELD packets and the 2-EV5 transport packets based on the stereo HFP configuration information received from the Bluetooth driver 403. In one aspect, the Bluetooth modem 405 may configure the packet size of the ELD packets based on the desired audio quality level and the desired bandwidth. In one aspect, the Bluetooth modem 405 may configure the 2-EV5 transport packets to include redundant or FEC packets based on a trade-off between the desired audio quality and robustness against packet loss.

At operation 423, the application layer software 401 receives encoded stereo audio signals representing the far-field speech of the remote user in the telephony or videoconferencing application. The application layer software 401 may decode the far-field speech signals to stream downlink stereo signals to the Bluetooth driver 403.

At operation 425, the Bluetooth driver 403 encodes the downlink stereo audio signals using the configured AAC-ELD codec to generate audio frames of downlink encoded stereo audio signals for each of the two channels. The Bluetooth driver 403 may transmit the audio frames to the Bluetooth modem 405.

At operation 427, the Bluetooth modem 405 packetizes the audio frames of downlink encoded stereo audio signals for the two channels into ELD packets based on its configuration from operation 421. The Bluetooth modem 405 bundles or concatenate the ELD packets into the Bluetooth 2-EV5 transport packets. In one aspect, the Bluetooth modem 405 may bundle into the 2-EV5 transport packets redundant or FEC packets used for packet loss recovery. The Bluetooth modem 405 may transmit the 2-EV5 transport packets containing the packetized audio frames of the downlink encoded stereo audio signals over the Bluetooth link to the Bluetooth headset 407.

Figure 5:
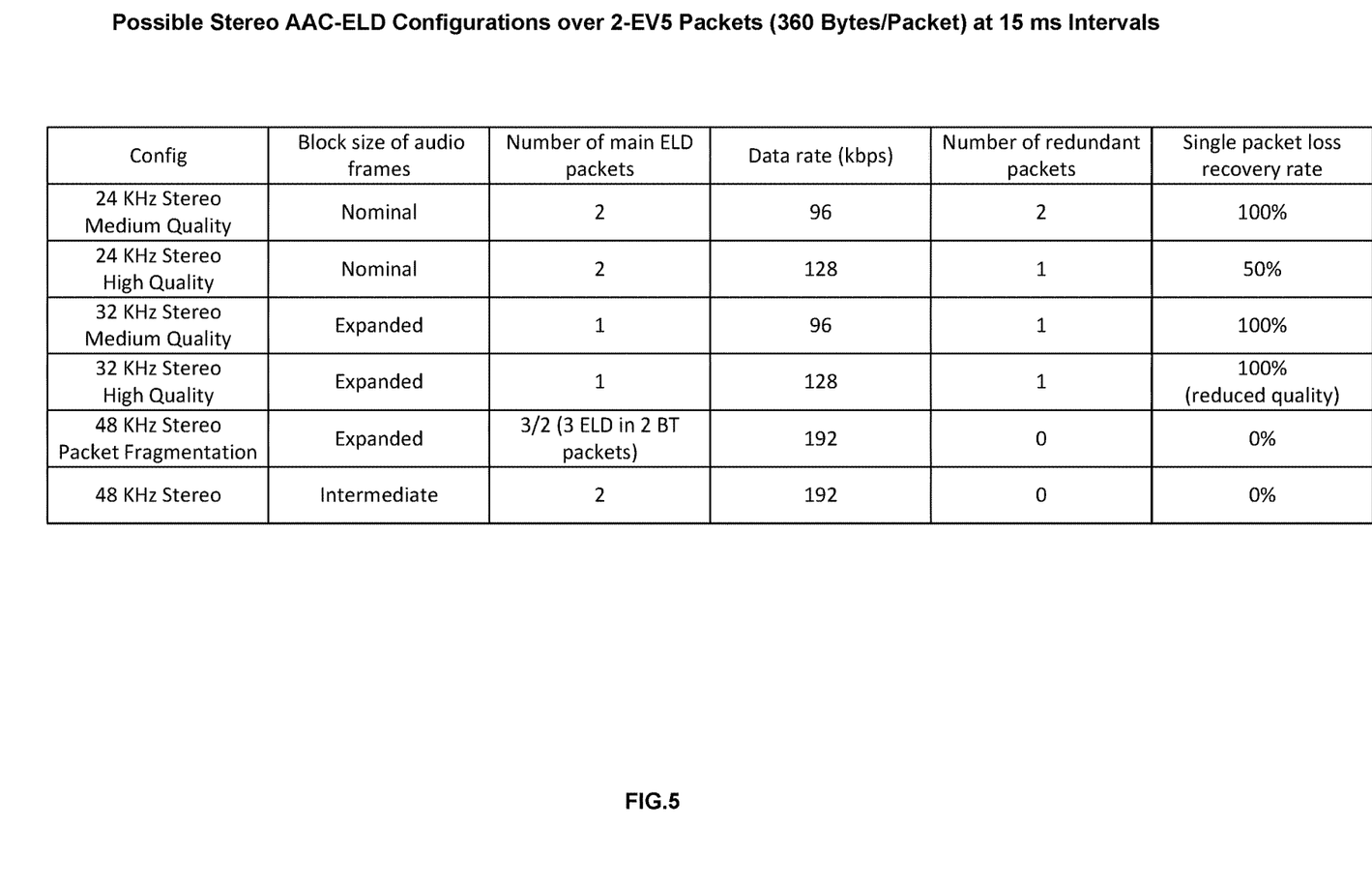
FIG. 5 shows the possible stereo AAC-ELD configurations for encoding and transporting ELD packets of audio frames using the 360-byte 2-EV5 transport packets with a packet duration of 15 ms in stereo HFP according to one aspect of the disclosure.

FIG. 5 shows the possible stereo AAC-ELD configurations for encoding and transporting ELD packets of audio frames using the 360-byte 2-EV5 transport packets with a packet duration of 15 ms in stereo HFP according to one aspect of the disclosure.

In one aspect, to support 12 KHz WB audio in stereo HFP, the AAC-ELD codec may be configured to generate the two channels of stereo audio signals using the sampling rate of 24 KHz. The 24 KHz stereo AAC-ELD configuration may generate audio frames of a nominal block size. In one aspect, the nominal block size may have 180 samples and a frame duration of 7.5 ms for each channel. The audio frames of the two channels may be packetized into ELD packets of different sizes as a function of the desired audio quality.

In one aspect, for encoding stereo WB audio at the medium quality level, two ELD packets within a current 15 ms interval of the 2-EV5 transport packet may be bundled with two ELD packets from a previous 15 ms interval to constitute the 360 bytes of the 2-EV5 transport packet every 15 ms. The two ELD packets of the previous 15 ms interval are considered redundant or forward error correction (FEC) packets that may be used by the decoder to recover up to 100% of single packet loss. The maximum data rate may be 96 kbps. In one aspect, for encoding stereo WB audio at the high quality level, two ELD packets within a current 15 ms interval of the 2-EV5 transport packet may be bundled with one of the two ELD packets from a previous 15 ms interval to constitute the 360 bytes of the 2-EV5 transport packet every 15 ms. The maximum data rate may be 128 kbps. The 120 bytes of the redundant or FEC packet from the previous 15 ms interval may allow recovery of up to 50% of single packet loss. The high quality stereo WB audio achieves higher audio quality but at a cost of reduced robustness against packet loss when compared to the medium quality stereo WB audio.

In one aspect, for WB audio in stereo HFP, the AAC-ELD codecs for uplink and downlink may be configured to run at the same 24-KHz sampling rate. In one aspect, the AAC-ELD packet transport may be configured for dynamic bit rate switching between the high quality and medium quality levels under the 24 KHz stereo AAC-ELD configuration to flexibly perform trade-offs between audio quality and robustness against packet loss. For example, while running high quality WB audio in stereo HFP, the 24 KHz stereo AAC-ELD configuration may be switched to medium quality WB audio when there is excessive packet loss due to interference or degraded channel condition of the Bluetooth link.

In one aspect, the audio frame may be expanded to support the higher sampling rate and the resulting bigger block size needed for the wider audio bandwidth of the 16 KHz SWB or the 24 KHz FB audio. In one aspect, for encoding the SWB audio, the AAC-ELD codec may be configured with a sampling rate of 32 KHz to generate stereo audio samples of an expanded block size. In one aspect, when the AAC-ELD decoder of a sink device supports a maximum block size of 480 samples, the expanded block size may have 480 samples and a frame duration of 15 ms for each channel. The audio frames of the two channels may be packetized into ELD packets of different sizes as a function of the desired audio quality.

In one aspect, for encoding stereo SWB audio at the medium quality level, one ELD packet for a current 15 ms interval may be bundled with one ELD packet from a previous 15 ms interval to constitute the 2-EV5 transport packet of 360 bytes every 15 ms. The maximum data rate may be 96 kbps. The ELD packet of the previous 15 ms interval is the redundant or FEC packet that may be used by the decoder to recover up to 100% of single packet loss. In one aspect, for encoding stereo SWB audio at the high quality level, one ELD packet for a current 15 ms interval may be bundled with a smaller ELD packet of a previous 15 ms interval to constitute the 360-byte 2-EV5 transport packet every 15 ms. The maximum data rate may be 128 kbps. The smaller packet from the previous 15 ms interval may allow recovery of up to 100% of single packet loss, albeit at a reduced audio quality due to the smaller ELD packet size. The high quality stereo SWB audio achieves higher audio quality but at a cost of reduced robustness against packet loss when compared to the medium quality stereo SWB audio.

In one aspect, for SWB audio in stereo HFP, the downlink and uplink may be configured to run at different audio quality levels of the 32 KHz stereo AAC-ELD configuration. In one aspect, the 32 KHz stereo AAC-ELD configuration may be enabled for downlink direction only. The stereo HFP may configure the AAC-ELD codec for the uplink to run at a lower sampling rate, such as using the 24 KHz stereo AAC-ELD configuration. In one aspect, the AAC-ELD packet transport may be configured for dynamic bit rate switching between the high quality and medium quality levels under the 32 KHz stereo AAC-ELD configuration to flexibly perform trade-offs between audio quality and robustness against packet loss.

In one aspect, for encoding FB audio with an audio bandwidth of 24 KHz, the AAC-ELD codec may be configured with a sampling rate of 48 KHz to generate stereo audio frames of the expanded block size. The audio frames of the two channels may be packetized into ELD packets. Three ELD packets may be fragmented into two 2-EV5 transport packets. The maximum data rate may be 192 kpbs. Because the ELD packets fully occupy the 360 bytes of each 2-EV5 transport packet, no redundant or FEC packets are available for use to recover from packet loss.

In one aspect, if the AAC-ELD decoder of a sink device supports a maximum block size of 360 samples, packet fragmentation associated with the 48 KHz stereo AAC-ELD configuration may be eliminated. For example, for encoding the FB audio in stereo, the 48 KHz stereo AAC-ELD configuration may configure the AAC-ELD codec with a sampling rate of 48 KHz to generate audio frames of an intermediate block size. In one aspect, the intermediate block size may have 360 samples and a frame duration of 7.5 ms for each channel. The audio frames of the two channels may be packetized into ELD packets. Two ELD packets may be bundled or concatenated to constitute the 2-EV5 transport packet of 360 bytes every 15 ms, yielding a maximum data rate of 192 kbps. Again, because the new ELD packets fully occupy the 360 bytes of each 2-EV5 transport packet, no redundant or FEC packets are available for use to recover from packet loss.

In one aspect, for FB audio in stereo HFP, the downlink and uplink may be configured to run at different audio quality levels of the 48 KHz stereo AAC-ELD configuration. In one aspect, the 48 KHz stereo AAC-ELD configuration may be enabled for downlink direction only. The stereo HFP may configure the AAC-ELD codec for the uplink to run at a lower sampling rate, such as using the 32 KHz or 24 KHz stereo AAC-ELD configuration. The support for 48 KHz stereo AAC-ELD configuration in downlink enables audio quality similar to or exceeding that of uni-directional wireless audio connection such as the Advanced Audio Distribution Profile (A2DP).

Figure 6:
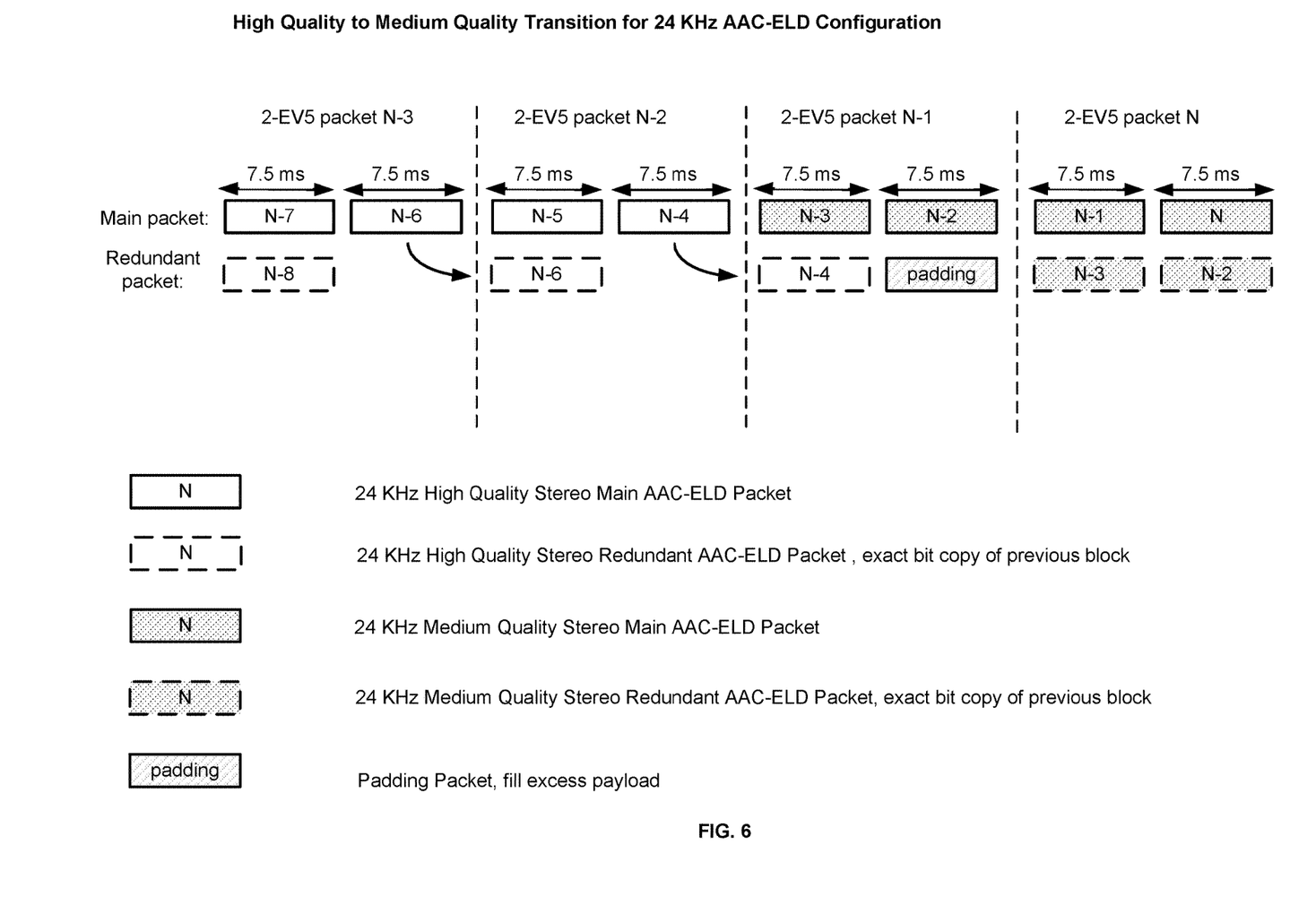
FIG. 6 shows the bundling of the constituent ELD packets in 2-EV5 transport packets when transitioning from high quality to medium quality for 24 KHz stereo AAC-ELD configuration according to one aspect of the disclosure.

FIG. 6 shows the bundling of the constituent ELD packets in 2-EV5 transport packets when transitioning from high quality to medium quality for 24 KHz stereo AAC-ELD configuration according to one aspect of the disclosure. The AAC-ELD packet transport may be configured to switch between the high quality and medium quality levels under the 24 KHz stereo AAC-ELD configuration to flexibly perform trade-offs between audio quality and robustness against packet loss.

The AAC-ELD packet transport is initially configured to encode stereo WB at the high quality level. The 360 bytes of each 2-EV5 transport packet includes two ELD packets from a current 15 ms interval, the ELD packets generated based on the 24 KHz stereo AAC-ELD configuration at the high quality level, and one of two ELD packets from a previous 15 ms interval that is the redundant packet. In one aspect, the redundant packet may be a duplicate of the ELD packet transmitted in the previous 15 ms interval. A sink device may use the redundant packet to recover from a packet loss with a 50% recovery rate. When there is excessive packet loss due to interference or degraded channel condition, the stereo HFP may configure the AAC-ELD packet transport to switch from the high quality level to the medium quality level.

In one aspect, during the transition, the 360 bytes of the 2-EV5 transport packet may include two ELD packets in the 15 ms of the transition interval, the two ELD packets generated based on the 24 KHz stereo AAC-ELD configuration at the medium quality level, and one of two ELD packet from the previous 15 ms interval that is the redundant packet, the ELD redundant packet generated based on the 24 KHz stereo AAC-ELD configuration at the high quality level. The remaining excess payload of the 2-EV5 transport packet may include a padding packet. After the transition, the 360 bytes of the 2-EV5 transport packet may include two ELD packets from a current 15 ms interval, the two ELD packets generated based on the 24 KHz stereo AAC-ELD configuration at the medium quality level, and two ELD packets from a previous 15 ms interval that are the redundant packets.

Figure 7:
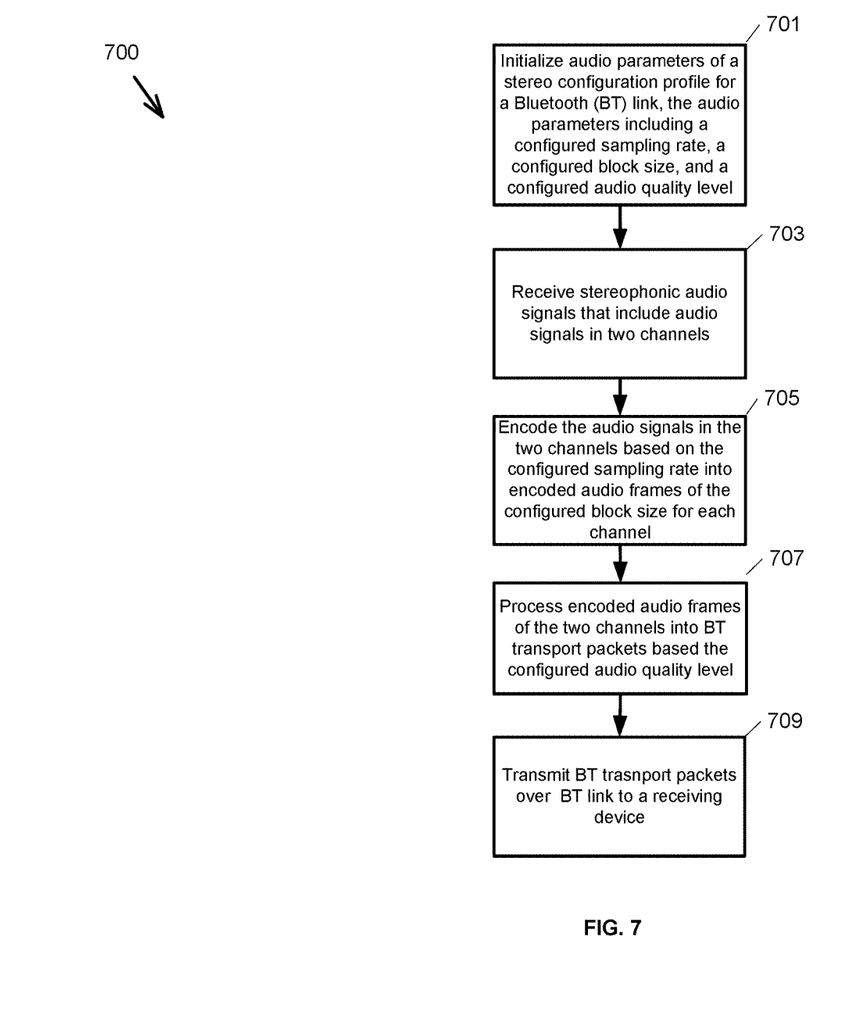
FIG. 7 is a flow diagram of a method for streaming stereo audio signals over a Bluetooth link from a source device to a receiving device using stereo HFP according to one aspect of the disclosure.

FIG. 7 is a flow diagram of a method 700 for streaming stereo audio signals over a Bluetooth link from a source device to a receiving device using stereo HFP according to one aspect of the disclosure. The method 700 may be practiced by one or more of the, module, modem, software, and driver of the source device of FIGS. 1, 2, 3 and 4.

In operation 701, the stereo HFP initializes audio parameters for a stereo configuration profile for a source device of a Bluetooth link. The audio parameters include a configured sampling rate of a codec, a configured block size of encoded audio frames, and a configured audio quality level.

In operation 703, the source device receives stereophonic audio signals. The stereophonic signals may include audio signals for two channels.

In operation 705, the source device encodes the audio signals in each of the two channels based on the configured sampling rate into encoded audio frames of the configured block size for each of the two channels.

In operation 707, the source device processes the encoded audio frames of the two channels into Bluetooth transport packets based on the configured audio quality level.

In operation 709, the source device transmits the Bluetooth transport packets over the Bluetooth link to a receiving device.

Aspects of the stereo HFP protocol described herein may be implemented in a data processing system, for example, by a network computer, network server, tablet computer, smartphone, laptop computer, desktop computer, other consumer electronic devices or other data processing systems. In particular, the operations described for the stereo HFP protocol are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain exemplary instances have been described and shown in the accompanying drawings, it is to be understood that these are merely illustrative of and not restrictive on the broad disclosure, and that this disclosure is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

As described above, one aspect of the present technology is the transmission and use of speech or data from specific and legitimate sources to an audio output device. The present disclosure contemplates that in some instances, this speech or data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information. The present disclosure recognizes that the use of such personal information data, in the present technology, can be used to the benefit of users.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers the transmission of use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

What is claimed is:

1. A method comprising:
    receiving, at a first device, a pair of audio signals in stereo format, wherein the pair of audio signals includes a left audio channel and a right audio channel;
    determining, at the first device, that the pair of audio signals are to be transmitted using a bi-directional stereo configuration profile used to enable an exchange of audio signals in stereo format over a Bluetooth link with a second device;
    determining, responsive to determining that the pair of audio signals are to be transmitted to the second device, at the first device, a set of audio parameters including sampling rate, a block size of audio samples, and an audio quality level for the bi-directional stereo configuration profile;
    generating, at the first device, encoded audio frames for each audio signal based on the sampling rate, the encoded audio frames having the block size;
    generating, at the first device, transport packets from the encoded audio frames of the pair of audio signals based on the audio quality level; and
    transmitting, from the first device, the transport packets over the Bluetooth link to the second device to enable rendering of the pair of audio signals.

2. The method of claim 1, wherein the pair of audio signals is a first pair of audio signals in the stereo format and the set of audio parameters is a first set of audio parameters, wherein the method further comprises:
    receiving, at the first device and from the second device, additional transport packets over the Bluetooth link that include audio frames for each audio signal of a second pair of audio signals in the stereo format, wherein the audio frames are encoded according to a second set of audio parameters for the bi-directional stereo configuration profile; and
    rendering, at the first device, the second pair of audio signals.

3. The method of claim 1, wherein generating the encoded audio frames comprises:
    generating digitized samples of each audio signal at the sampling rate; and
    generating the encoded audio frames for each audio signal by performing audio encoding of the digitized samples of the pair of audio signals to generate the encoded audio frames having the block size.

4. The method of claim 1, wherein the sampling rate and the block size configured by the bi-directional stereo configuration profile are identical to a sampling rate and a block size configured by a mono configuration profile used to enable transmissions of mono audio signals over the Bluetooth link.

5. The method of claim 1,
    wherein the sampling rate is determined by an audio bandwidth of the pair of audio signals,
    wherein the block size of the encoded audio frames is determined by a capability of a decoder of the second device used to decode the encoded audio frames to render the pair of audio signals.

6. The method of claim 1, wherein the bi-directional stereo configuration profile comprises a configuration for a Hands-Free Profile (HFP) used to enable transmissions of the audio signals in the stereo format in both directions between the first device and the second device over the Bluetooth link, and wherein the transport packets comprise 2-EV5 packets of the HFP.

7. The method of claim 1, wherein generating the transport packets comprises:
    generating a plurality of encoded packets, wherein each of the encoded packets is generated from the encoded audio frames having the block size for the pair of audio signals based on the audio quality level; and
    generating a plurality of the transport packets, wherein each of the transport packets is generated from one or more of the plurality of encoded packets within a duration of the transport packets.

8. The method of claim 7, wherein for a same sampling rate and a same block size, the encoded packets for different audio quality levels have different packet sizes.

9. The method of claim 7, wherein each of the transport packets includes one or more of the encoded packets that were previously transmitted to aid the second device in recovering a loss of the previously transmitted encoded packets.

10. The method of claim 9, wherein the audio quality level configured by the bi-directional stereo configuration profile is determined dynamically by the first device based on a degree that the second device is able to recover the loss of the previously transmitted encoded packets.

11. A device comprising:
at least one processor; and
a memory coupled to the at least one processor to store instructions, which when executed by the at least one processor, cause the at least one processor to perform operations comprising:
  receive a pair of audio signals in stereo format, wherein the pair of audio signals includes a left audio channel and a right audio channel;
  determine that the pair of audio signals are to be transmitted using a bi-directional stereo configuration profile used to enable an exchange of audio signals in the stereo format over a Bluetooth link with a second device;
  determine, responsive to determining that the pair of audio signals are to be transmitted to the second device, a set of audio parameters including sampling rate, a block size of audio samples, and an audio quality level for the bi-directional stereo configuration profile;
  generate encoded audio frames for each audio signal based on the sampling rate, the encoded audio frames having the block size;
  generate transport packets from the encoded audio frames of the pair of audio signals based on the audio quality level; and
  transmit the transport packets over the Bluetooth link to the second device to enable rendering of the pair of audio signals.

12. The device of claim 11, wherein the sampling rate is determined by an audio bandwidth of the pair of audio signals.

13. The device of claim 11, wherein, to generate the encoded audio frames, the at least one processor further executes the instructions stored in the memory to perform operations comprising:
  generate digitized samples of each audio signal at the sampling rate; and
  generate the encoded audio frames for each audio signal by audio encoding the digitized samples of the pair of audio signals to generate the encoded audio frames having the block size.

14. The device of claim 11, wherein the pair of audio signals is a first pair of audio signals in the stereo format, wherein the at least one processor executes the instructions stored in the memory to perform operations comprising:
  receive, from the second device, additional transport packets over the Bluetooth link that include audio frames for each audio signal of a second pair of audio signals in the stereo format, wherein the audio frames are encoded according to a second set of audio parameters for the bi-directional stereo configuration profile; and
  render the second pair of audio signals.

15. The device of claim 11, wherein the block size of the encoded audio frames is determined by a capability of a decoder of the second device used to decode the encoded audio frames to render the pair of audio signals.

16. The device of claim 11, wherein the bi-directional stereo configuration profile comprises a configuration for a Hands-Free Profile (HFP) used to enable transmissions of the pair of audio signals in the stereo format in both directions between the device and the second device over the Bluetooth link, and wherein the transport packets comprise 2-EV5 packets of the HFP.

17. The device of claim 11, wherein, to generate the transport packets, the at least one processor further executes the instructions stored in the memory to perform operations comprising:
  generate a plurality of encoded packets, wherein each of the encoded packets is generated from the encoded audio frames having the block size for the pair of audio signals based on the audio quality level; and
  generate a plurality of the transport packets, wherein each of the transport packets is generated from one or more of the plurality of encoded packets within a duration of the transport packets.

18. The device of claim 17, wherein for a same sampling rate and a same block size, the encoded packets for different audio quality levels have different packet sizes.

19. The device of claim 17, wherein each of the transport packets includes one or more of the encoded packets that were previously transmitted to aid the second device in recovering a loss of the previously transmitted encoded packets.

20. The device of claim 19, wherein the audio quality level configured by the bi-directional stereo configuration profile is determined dynamically by the device based on a degree that the second device is able to recover the loss of the previously transmitted encoded packets.

* * * * *